M. H. KASHIAN.
CONVERTIBLE AUTOMOBILE TOP.
APPLICATION FILED JULY 24, 1916.
1,274,275.
Patented July 30, 1918.
2 SHEETS—SHEET 2.
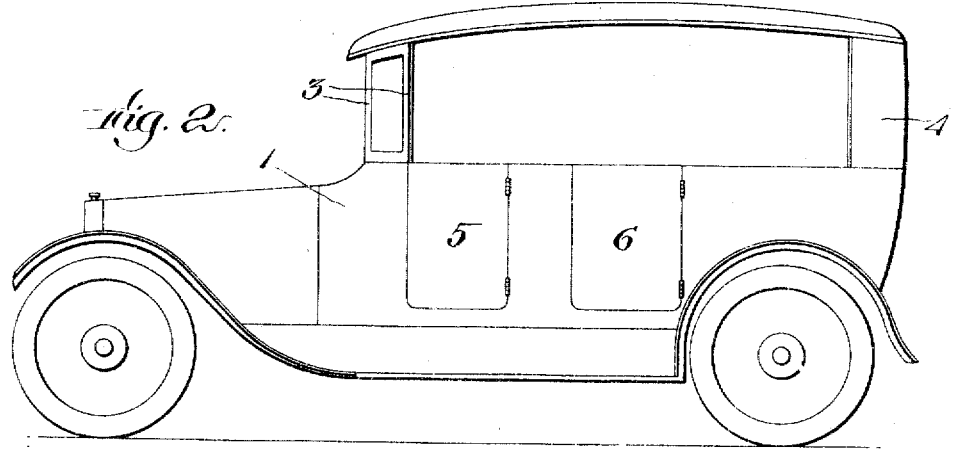
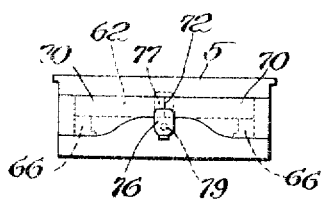
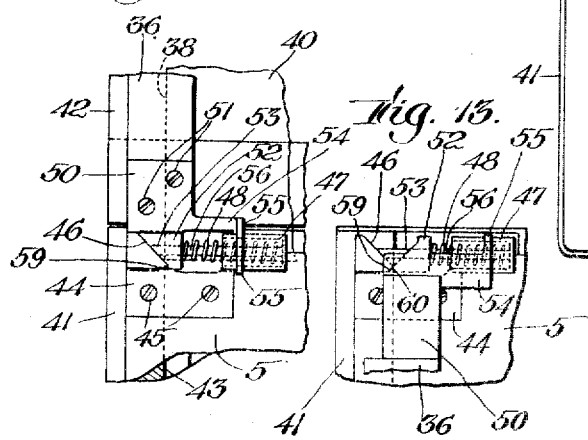
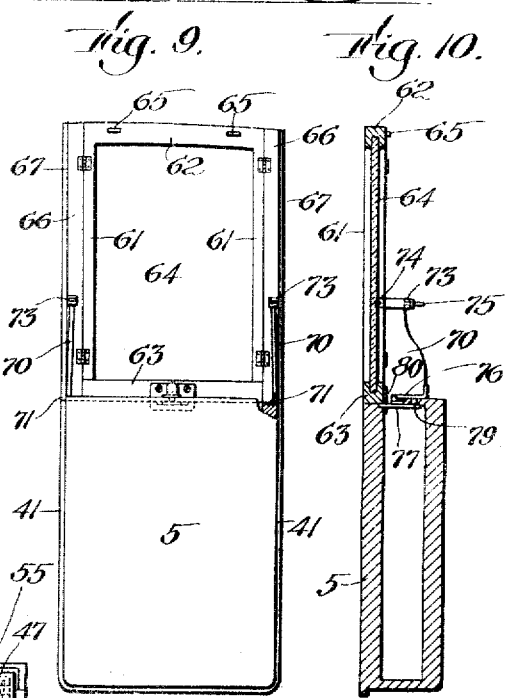
Inventor:
Minas H. Kashian,
by Geo. H. Maxwell,
Attorney.

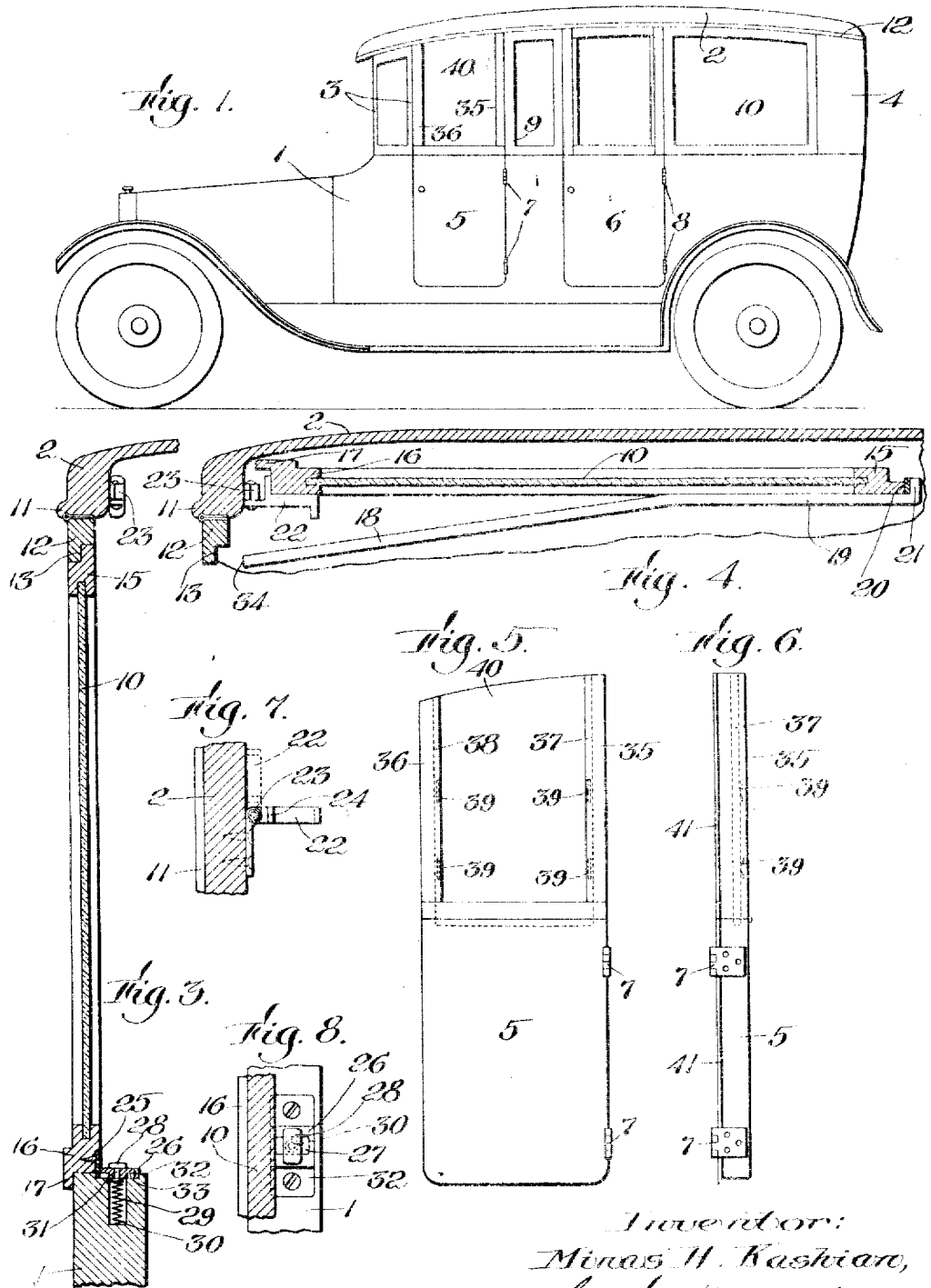

UNITED STATES PATENT OFFICE.

MINAS H. KASHIAN, OF AMESBURY, MASSACHUSETTS.

CONVERTIBLE AUTOMOBILE-TOP.

1,274,275.

Specification of Letters Patent.

Patented July 30, 1918.

Application filed July 24, 1916. Serial No. 110,838.

*To all whom it may concern:*

Be it known that I, MINAS H. KASHIAN, a resident of Amesbury, in the county of Essex and State of Massachusetts, have invented an Improvement in Convertible Automobile-Tops, of which the following description, in connection with the accompanying drawings, is a specification, like letters on the drawings representing like parts.

My present invention is an improvement in the convertible automobile tops of the type shown in my copending application, Serial No. 48,566, filed September 1, 1915, and the object of the invention is to improve and perfect such automobile tops. Particular objects of the invention are to improve the particular features of construction such as the housing portions of the swinging doors, the top covers, supporting portions and hinges and other details of construction.

Referring to the drawings illustrating the preferred embodiments of the invention:

Figure 1 is a side view of an automobile, having the top in place and showing the same closed;

Fig. 2 is a corresponding side view showing the top open and illustrating the complete convertibility from closed to open construction;

Fig. 3 is an enlarged side view, partly in cross section, showing a fragment of the standing portion of the top and body with a removable side in place;

Fig. 4 is a cross sectional view but also enlarged, showing the removable side, Fig. 3, housed in the top;

Fig. 5 is a side view, somewhat enlarged, of the door;

Fig. 6 is a side view of the door shown in Fig. 5;

Figs. 7 and 8 are enlarged views of certain details showing improved fastenings;

Fig. 9 is a modified view of housed door top construction;

Fig. 10 being a side view partially in cross section of the door;

Fig. 11 is a plan view of the door shown in Figs. 9 and 10;

Figs. 12 and 13 are fractional enlarged views illustrating my novel arrangement for housing the top door portions wherein they are swung inwardly and downwardly to clear the sides of the body and permit the door to swing.

As illustrating the invention, in Figs. 1 and 2, an automobile body 1 is shown, having a detachable top 2, such as is illustrated in my copending application above mentioned, or, this may be a fixed top carried by the front and rear supports 3 and 4 respectively, leaving the entire side portions of the body free and open, when the removable sides are housed as clearly illustrated in Fig. 2. Body 1 is provided with the usual pair of side doors, 5 and 6 in each side, as illustrated, which are swung on fixed pairs of hinges 7 and 8 respectively.

My present invention has a novel means for supporting, holding, and housing the removable sides both over the fixed portions of the body and at the tops of the doors 5 and 6.

The construction illustrating the housing and fitting of the removable side parts 9 and 10 over the side body portions will be first described and then the arrangement for the top portions of the doors will be explained.

As shown in Figs. 3 and 4, top 2 has provision for the housing of side 10, substantially as illustrated in the convertible top of my said copending application but comprises improved details therefor. Under the drip molding 11 is hinged a top part 12, having a groove 13 adapted to coöperate with a corresponding groove and flange in the top frame 15, of the side. In the bottom frame 16 is a similar groove and flange 17 adapted to fit over the outside adjacent portion of body 1. The glass portion of the frame is designated by a reference character, 10, which also is herein used to identify generally said removable side. To house the side 10, hinged top part, 12 is raised, and the side released from the bottom catch (which will be further explained), and swung upwardly into the housing portion 2, with the frame resting and sliding upon the inclined portion 18 of the top cover until it is moved entirely within said top, then sliding upon the track 19, and with the top frame 15 in contact with a rubber washer, 20, secured to the upturned flange 21 at the end of the track 19. The bottom frame 16 is then raised and supported on the holder 22 pivoted at 23. The holder 22 is swung outwardly from the dotted line position shown in Fig. 7, to the full line position, a flange or lug 24 on said holder 22 bearing on the bottom frame 16 (see Fig. 4), and acting as a combined clamp and holder to force the frame longitudinally against the rubber washer, 20, and hold it rigidly as well as yieldingly in position, locking the same horizontally in the housing in alinement with the top. To remove side 10, holder 22 is simply swung back against the rim of top 2, as shown in dotted line position of Fig. 7, and the side 10 will drop downwardly on the inclined portion 18, and thus permitting frame 10 to naturally drop downwardly ready to be removed. This frame is then slid outwardly, the hinged member 12 yielding for this purpose until top frame 15 is in position to fit and register with the corresponding grooved flange 13, when the bottom frame 16 is swung inwardly and fitted on body 1, as shown in Fig. 3. As the tracks 18 are at the side only, this operation can be performed by the occupant inside the car and the sides closed or opened without stopping the car or handling the removable frames from the outside. This is a great convenience and advantage during sudden rain squalls and the like. To secure frame 10 in place, I prefer to have an automatic catch at the bottom. This requires an angle iron with one arm, 25, secured to the bottom frame 10, and the other arm, 26, extending at right angles thereto, and having an enlarged slot 27 adapted to receive the head 28 of a spring pressed plunger. This plunger is normally in alinement with the slot 27 (see Fig. 8) and when the frame is swung into position over the body 1, arm 26 will depress the plunger against the tension of its spring 29, fitted in a recess 30 in top of body 1, until the slot 27 is entirely over the same when spring 29 will force head 28 up through said slot and said head is mounted pivotally on rim 31 so that it may be turned at right angles to the slot 27 and lock the flange and side in position. A plate 32 is preferably provided, countersunk in the top of body 1 and a sufficient recess 33 is formed therein to permit the head 28 to be depressed by the arm 26 as it is swung into place. Any suitable spring or lock may be used to hold the top frame 15 in position with the upper pivoted member 12, the end 34 of the inclined track 18 acting to a certain extent in retaining the top frame 15 in proper position until so locked when the removable frame is being lowered, as above explained. The removable portion 9 is similarly arranged and operated to the frame 10 just described.

In order to have the top portions of the doors 5 and 6 also removable, great difficulty has been experienced because of the necessity of swinging the doors inwardly and having the top portion also thus swing while overlapping the respective sides, to make the same shed rain. To this end I have devised a novel arrangement whereby the side frame carrying the top of the door may be housed within the lower portion of the door and furthermore may be so housed as to permit the opening and closing of the side doors without interruption with such overlapping flanged portion. I also prefer to arrange the top sides of the frame and the glass portion therein over the doors so that the glass may be lowered or closed as desired. As shown in Figs. 5 and 6 the fore door 5 is provided with removable side frame portions, 35 and 36 for the upper removable part, having grooves therein, 37 and 38 respectively, and having a plurality of friction springs 39, said grooves being adapted to receive the glass 40, and the springs 39 serving to hold the glass in any desired height to which it may be raised in the grooves, said glass normally sliding downwardly within continuations of the grooves 37 and 38 in the lower inner portion of the door 5, as will be readily understood. I will mount these upstanding portions 35 and 36 of the frame so as to hold them in the upper and outward position, as shown in Figs. 5 and 6, with their edges flush with the outer edge portions of door 5, and yet have the edge portions of door 5 downwardly and means to swing these sides downwardly and at the same time inwardly toward each other so that when housed or folded down against the inner side of door 5 they will be moved inwardly entirely beyond the overlapping portion of the side edges of door 5, and thus not interfere with the opening or closing of the door. This construction is shown in one form in Figs. 9, 10 and 11 and in the further and preferred form in Figs. 12 and 13. The latter will be first described as this form is illustrated in Figs. 5 and 6. Door 5 has the overlapping portion, 41 entirely around the same and constitutes a rain-proofing closure, and the top sides, 35 and 36 are similarly provided with a flange, 42. When in upright position, side 36, for example, (see Fig. 12) is so arranged that the flange 42 will register with the adjacent portion of flange 41 in door 5, with the inner groove 38 to receive the glass 41 when raised, similarly registering with the extended portion of said groove 43 in the side of inner and lower portion of door 5. A corresponding construction may be provided for the opposite frame, 35. To accomplish this purpose, I have devised a novel form of spring and hinge which secures frame 36 to the door 5, and which will swing said frame outwardly when it is raised in an upright position, and will similarly swing said frame inwardly when lowered. Preferably automatic means to fix, hold and lock said frame in respective upright and downward positions, are also provided. This construction comprises a hinge plate 44 secured at 45 by suitable bolts to the door 5, and having an upstanding beveled portion 46 on its outer side. Plate 44 also carries a cylindrical barrel or lug 47, having a recess therein, and acts as a guide for the coiled spring, 48, which has its coils around stem 56. The construction thus described permits the arm 36, when in lowered position, to be raised and forced outwardly, or to the left, (viewing Figs. 12 and 13), by the spring 48 until the beveled face 52 on the top plate 50 registers with the correspondingly beveled face 46 on the lower end plate arm 44, and hinge 55 sliding over the barrel 47 during this raising and outwardly moving action. When thus raised the frame 36 will be flush with the outside of door 5 with its glass receiving groove 38 and its overlapping flange portion 42, registering with the corresponding groove and flange, 43 and 41 in door 5. Frame 35 is similarly raised and moved outwardly and glass 40 may be raised in the top, as desired, being held by its frictional engagement with the spring 39 in said groove. When lowered, the glass is first dropped downward and housed within door 5 and then frame 36 is simply swung toward the beveled faces, 53 and 46, frame 36 sliding inwardly or to the right. To lock frame 36 both in upward and lowered positions, I form corresponding shoulders, 59 and 60 on the beveled faces 46 and 53 at the limit of the movements of these hinge portions so that the spring, 48, will snap said shoulders into engagement and hold the same rigidly at the limit of said downward and lowered positions permitted by this hinge. An additional locking device can be applied if desired.

In another form of removable top for door 5, I may provide a frame having the sides 61, 61, top 62 and bottom frame 63 inclosing the glass 64. This frame is provided with handles, 65, so that it may be lowered entirely within door 5 which has ample space between the front and back for such housing, as shown in Fig. 10. Hinged to the side frame 61 are extensible frame portions, 66, each being provided with overlapping flanges, 67, registering with corresponding portions 41 of the door 5. When the frame is raised, these end portions, 66, are swung outwardly and secured in outward position, thus constituting the complete closing portion for the top door. To house the top, sides 66 are first swung inwardly against frame side 61, and then the entire top of the door thus partially reduced in width is lowered within the door 5 and provides a support for side 66 as well as a cover for door 5: when the removable top is housed therein, I provide a pair of arm like members, 70, pivoted to the door 5 by hinges 71 at each edge and adapted to fold downwardly and inwardly, meeting at the center, 72 (see Fig. 11), constituting a closure for the opening in the top door which opening is of suitable shape to permit the top frame with the folded side, 66, to be lowered therethrough as clearly shown in Fig. 11. The side arms, 70, afford the proper rigidity to the folded frame portion, 66, when the latter are extended, clamps 73 being pivoted at 74 to the member 66 and adapted to fit over the tops of the arm 70. For the purpose of further securing and holding the same, a thumb screw, 75, may be fitted through the clamp, 73, and more firmly lock the arms, 70, and its adjacent frame portion, 66, and prevent the rattling as illustrated in Fig 10. To hold the clamp arm 70 in downward position and also to lock the door top in upper position, I provide a clamping member, comprising an upper plate 76, and a lower plate, 77, united by a pivot, 79. The top and lower plates are spaced sufficiently to catch and inclose the ends of the side arms, 70, when the latter are folded downwardly as shown in Fig. 11, and the lower plate, 77, is of sufficient length to reach and engage the slot in a plate, 80, carried by the bottom frame, 63. The lowering and opening operation in this type of top will be readily appreciated in the foregoing description. Either doors, 5 or 6, may be provided with one of the foregoing constructions. The entire removable operations of sides are readily, quickly and almost instantly accomplished by the occupant inside the car, and both doors and sides over the body portions are independently supported and housed, and yet provide the proper overlapping rain proofing features.

Having described my invention, what I claim as new and desire to secure by Letters Patent, is:

1. A door for automobile bodies having a lower portion hinged to the body and removable top portion adapted to be housed within said lower portion, guides in which the top portion slides when in raised position, and means connecting said guides with the door portion, said means acting to move said guides laterally away from the door edges, upon the housing of the top within the lower portion.

2. A door for automobile bodies having a lower portion hinged to the body and removable top portion adapted to be housed within said lower portion, guides in which the top portion slides when in raised position, and hinges connecting said guides to the body portion permitting them to be folded downwardly against said door portion in combination with automatic means to move the guides laterally and inwardly as they are folded downwardly.

3. A door for automobile bodies having a lower portion hinged to the body and removable top portion adapted to be housed within said lower portion, guides in which the top portion slides when in raised position, and beveled faces coöperating with said hinges to move the guides laterally and inwardly as they are folded downwardly against the door.

4. A door for automobile bodies having a lower portion hinged to the body and removable top portion adapted to be housed within said lower portion, guides in which the top portion slides when in raised position, and beveled faces coöperating with said hinges to move the guides laterally and inwardly as they are folded downwardly against the door, said beveled faces terminating in shoulders acting to lock the guides either in folded position or in raised position and yielding means to hold said parts in said locked position.

In testimony whereof, I have signed my name to this specification, in the presence of two subscribing witnesses.

MINAS H. KASHIAN.

Witnesses:
JAMES R. HODDER,
HAROLD J. CLARK.